Sept. 11, 1956  S. ALLEN  2,762,334
ANTI-KICKING TYPE ANIMAL RESTRAINING DEVICE
Filed Oct. 19, 1953
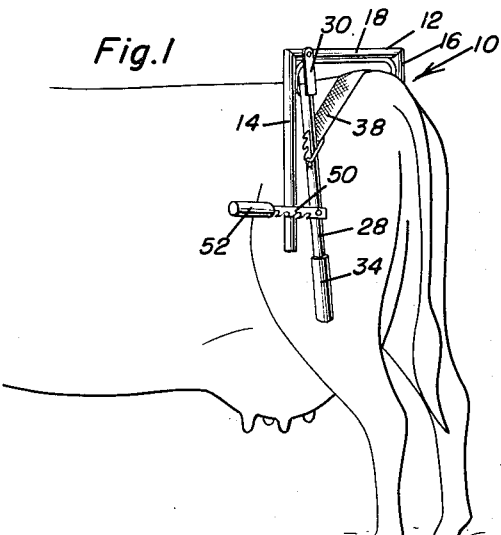
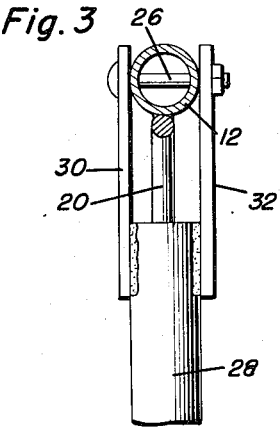
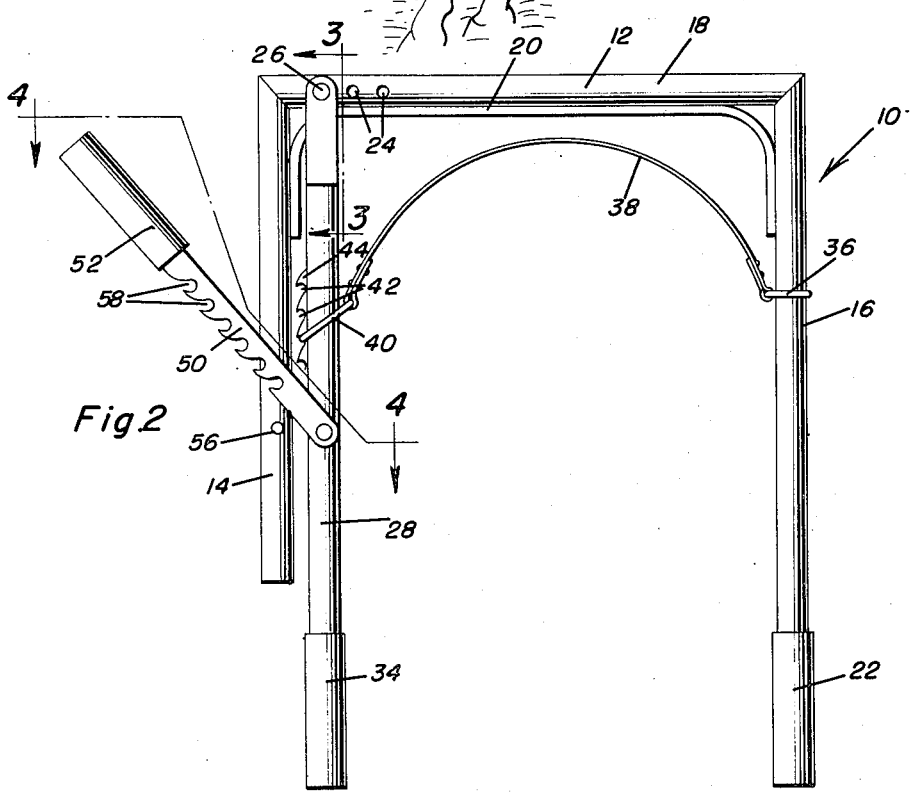
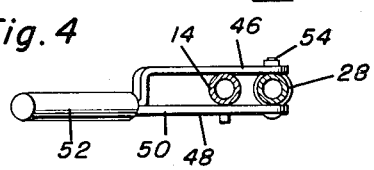
Seth Allen
INVENTOR.

United States Patent Office 2,762,334
Patented Sept. 11, 1956

2,762,334

ANTI-KICKING TYPE ANIMAL RESTRAINING DEVICE

Seth Allen, Valley Falls, Kans.

Application October 19, 1953, Serial No. 386,726

1 Claim. (Cl. 119—126)

This invention relates to the class of animal husbandry and more particularly to a device especially adapted for restraining animals against movement.

The primary object of this invention resides in the provision of an apparatus for restraining the rear legs of a cow so as to enable a cow to be readily broken to milking by preventing her from kicking or other movement of her rear legs.

The construction of this invention features a substantially U-shaped frame which is adapted to be supported upon the back of a cow. A limb is pivotally secured to the frame and together with the frame lockingly holds the rear legs of the cow against movement.

Still further objects and features of this invention reside in the provision of an animal restraining device that is strong and durable, simple to secure on an animal and which is automatically released should the cow fall or lie down on the side having the operating handle.

These, together with the various ancillary objects and features of the invention which will become apparent as the following description proceeds, are attained by this animal restraining device, a preferred embodiment of which has been illustrated in the accompanying drawings, by way of example only, wherein:

Figure 1 is a perspective view showing the animal restraining device as operatively positioned over the back of the cow immobilizing the hind portions of the cow;

Figure 2 is an elevational view of the animal restraining device illustrating the combination of elements comprising the invention in greatest detail;

Figure 3 is an enlarged sectional detail view as taken along the plane of line 3—3 in Figure 2; and Figure 4 is a sectional detail view as taken along the plane of line 4—4 in Figure 2 and illustrating the means utilized for lockingly holding the limb in a selected angular relationship relative to the outer leg of the frame.

With continuing reference to the accompanying drawings, wherein like reference numerals designate similar parts throughout the various views, reference numeral 10 generally designates the animal restraining device comprising the present invention which consists of a substantially U-shaped frame 12 having outer legs 14 and 16 interconnected by an upper cross-member 18. An arcuate rod 20 is secured to the legs 14 and 16 and to the cross-member 18 at the upper portions of the legs 14 and 16, and substantially reinforces the entire frame 12. It is to be noted that the leg 14 is substantially shorter than the leg 16, which is provided at the lower portion thereof with a resilient cylindrical protective guard 22 of rubber or like material so as to prevent chaffing or rubbing of the cow when pressed thereagainst.

Formed in the cross-member 18 are a plurality of apertures 24 for receiving a fastener 26 which extends through a selected one of the apertures 24 for pivotally mounting a limb 28 on the cross-bar 18, the fastener 26 extending through the bifurcated portions 30 and 32 of the upper end of the limb 28. The fastener 26 may, of course, be in the form of a bolt. At the lower end of the limb 28 there is a resilient cylindrical protective member 34 similar to the member 22 and formed of rubber or the like for the protection of the animal.

Secured by a ring 36 fastened to the leg 16 is a strap 38 of flexible material which has the other end 40 thereof provided with a ring for engagement within a selected one of the recesses 42 formed by prong elements 44 attached to the limb 28. In this manner, the frame 12 can be adjustably supported in spaced relationship relative to the back of the animal with the flexible strap 38 supporting the weight of the device.

The bifurcated end portions 46 and 48 of an operating lever 50 having an operating handle 52 are pivotally attached to the limb 28 by means of a bolt or like fastener 54.

The outer leg 14 is provided with a detent 56 which extends outwardly therefrom and which is adapted to seat within a selected one of the recesses 58 formed in the operating lever 50. The interengagement between the detent 56 and the selected recess 58 determines the angular relationship of the limb 28 relative to the leg 16. Obviously, the recess 58 selected is, of course, determined by the size of the cow.

The animal restraining device is used in a simple manner. The frame 12 is supported on the back of the animal by the strap 38 and after the limb 28 has been suspended from a selected one of the apertures 24, it is merely necessary to push the operating lever 50 using the handle 52 inwardly until the resilient portions 22 and 34 engage the legs of the cow behind the hip joints thereof to immobilize these legs. Then, the operating lever 50 can be engaged with the detent 56 to lockingly hold the limb 28 in the proper position. If the cow should fall down or lie down on the side where the operating lever 50 is located, the operating lever will be automatically released, thereby enabling the apparatus to be removed even though the cow is on her side.

Since from the foregoing, the construction and advantages of this animal restraining device are readily apparent, further description is believed to be unnecessary.

However, since numerous modifications will readily occur to those skilled in the art after a consideration of the foregoing specification and accompanying drawing, it is not intended to limit the invention to the precise embodiment shown and described, but all suitable modifications and equivalents may be readily resorted to.

What is claimed as new is as follows:

An animal restraining device comprising a frame of substantially inverted U-shape comprising a pair of downwardly depending outer legs interconnected by an upper cross-member, a strap affixed to a first of said legs, a plurality of apertures in said upper cross-member, an inner limb, a fastener secured in a selected one of said apertures adjustably pivotally securing said limb to said cross-member and at a selected distance from said first leg, the other end of said strap being adjustably secured to said limb, a locking handle pivotally attached to said limb and having a plurality of angularly inwardly extending locking recesses therein, a detent on the second of said legs adapted to seat in a selected one of said recesses to lockingly hold said limb at a selected angular relationship with said first of said legs while holding said handle substantially normal to said first of said legs, said first leg and said limb being of substantially equal length and each having a resilient covering at the lower ends thereof, said strap being arcuate in configuration and adapted to overlie the back of an animal.

References Cited in the file of this patent

UNITED STATES PATENTS

| 130,943 | Pyle | Aug. 27, 1872 |
| 546,999 | Cunningham | Oct. 1, 1895 |
| 1,014,910 | Sharit | Jan. 16, 1912 |